(12) United States Patent  (10) Patent No.: US 7,218,364 B2
Brindel  (45) Date of Patent: May 15, 2007

(54) DUAL MODE LIQUID CRYSTAL DISPLAYS (LCDS) WITH ELECTROMECHANICAL REFLECTIVE ARRAY

(75) Inventor: Jason R. Brindel, Apex, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 196 days.

(21) Appl. No.: 10/699,397

(22) Filed: Oct. 31, 2003

(65) Prior Publication Data

US 2005/0094066 A1    May 5, 2005

(51) Int. Cl.
G02F 1/1335    (2006.01)
(52) U.S. Cl. ................... 349/114; 359/230; 359/224
(58) Field of Classification Search ........ 349/113–114, 349/58
See application file for complete search history.

(56) References Cited

U.S. PATENT DOCUMENTS

| | | | | |
|---|---|---|---|---|
| 5,280,371 A * | 1/1994 | McCartney et al. | ........... | 349/64 |
| 6,034,807 A * | 3/2000 | Little et al. | ................... | 359/227 |
| 6,433,847 B1 * | 8/2002 | Minoura | ..................... | 349/113 |
| 6,556,334 B2 * | 4/2003 | Lee | .............................. | 359/230 |
| 6,750,932 B2 * | 6/2004 | Kim | ........................... | 349/114 |
| 6,762,741 B2 * | 7/2004 | Weindorf | ..................... | 345/102 |
| 6,879,308 B2 * | 4/2005 | Hsieh et al. | ................... | 345/87 |

FOREIGN PATENT DOCUMENTS

| | | |
|---|---|---|
| JP | 2001-004997 | 1/2001 |
| JP | 2001-311946 | 11/2001 |
| WO | WO 00/25169 | 5/2000 |

OTHER PUBLICATIONS

"The Core of and Iridigm Display," www.iridigm.com/tech_core.htm, date of access: Jan. 30, 2004.
"First Generation Product iMoD Matrix 1.0," www.iridigm.com/prod_digital.htm, date of access: Jan. 30, 2004.
"The iMoD Element has Built-In Memory," www.iridigm.com/tech_memory.htm, date of access: Jan. 30, 2004.
"iMoD Matrix Display Product Overview," www.iridigm.com/prod_overview.htm, date of access: Jan. 30, 2004.
"iMoD Technology is Compatible with LCD Infrastructure," www.iridigm.com/tech_compat.htm, date of access: Jan. 30, 2004.
"Pixels in an Iridigm Display," www.iridigm.com/tech_display.htm, date of access: Jan. 30, 2004.
"Replicating the Beauty of Mother Nature," www.iridigm.com/tech_overview.htm, date of access: Jan. 30, 2004.

* cited by examiner

*Primary Examiner*—Andrew Schechter
*Assistant Examiner*—Phu Vu
(74) *Attorney, Agent, or Firm*—Myers Bigel Sibley & Sajovec

(57)    ABSTRACT

Liquid crystal displays and devices including the same are provided that include a micro-electromechanical reflective array; and a plurality of plates associated with the micro-electromechanical reflective array. The plates are movable between first and second positions. The plates are configured to operate in a first mode of operation when the plurality of plates are in the first position and to operate in a second mode of operation when the plurality of plates are in the second position.

33 Claims, 5 Drawing Sheets

DUAL MODE LIQUID CRYSTAL DISPLAYS (LCDS) WITH ELECTROMECHANICAL REFLECTIVE ARRAY

BACKGROUND OF THE INVENTION

The present invention relates to displays, and more particularly, to liquid crystal displays (LCDs).

Liquid crystal displays are commonly used in, for example, laptop computers, digital clocks and watches, microwave ovens, compact disc (CD) players, mobile telephones, personal digital assistants (PDAs) and the like. The use of LCDs in these devices is common because, for example, LCDs may be thinner and lighter and may draw less power than, for example, cathode ray tubes (CRTs). As the demand for these electronic devices increases, LCDs may be required to become more versatile to meet consumer demand.

Currently, there are three types of LCDs: highly transmissive, highly reflective and transflective. A transmissive display is typically backlit by a light source, for example, a light emitting diode (LED) or an electroluminescent (EL) panel. Transmissive displays may operate well in poorly lit environments but may not function adequately in bright environments, for example, in brightly lit office environments or sunlight. A reflective device, on the other hand, is typically front lit by, for example, sunlight or office lighting. Reflective displays may operate well in brightly lit environments, but may not be as useful in a poorly lit environment. A transflective display is a combination of a transmissive display and a reflective display. In particular, transmissive devices use a paired system where a moderate percentage of light is reflected and a moderate percentage of light is transmitted all the time. As such, a transflective display may not operate as well as a reflective display when front lit in a bright environment and may not operate as well as a transmissive display when back lit in a poorly lit environment.

In view of the above, more versatile LCDs, for example, LCDs that can function fully in a variety of lighting conditions, for use in a variety of products may be desired.

SUMMARY OF THE INVENTION

Embodiments of the present invention provide liquid crystal displays and devices including the same that include a micro-electromechanical (MEMs) reflective array and a plurality of plates associated with the micro-electromechanical reflective array. The plates are movable between first and second positions and are configured to operate in a first mode of operation when the plurality of plates are in the first position and to operate in a second mode of operation when the plurality of plates are in the second position. In certain embodiments of the present invention the device includes a mobile terminal.

In some embodiments of the present invention, the liquid crystal display may further include a plurality of pixels and ones the plates may correspond to ones of the plurality of pixels. The first mode of operation may be a reflective mode of operation and the second mode of operation may be a transmissive mode of operation. In certain embodiments of the present invention, the reflective mode may include a pure reflective mode and the transmissive mode may include a pure transmissive mode.

In further embodiments of the present invention, the liquid crystal display may include an artificial light source. The micro-electromechanical reflective array may be positioned adjacent the artificial light source and the light source may be exposed through the plurality of plates during the transmissive mode of operation. In certain embodiments of the present invention, the artificial light source may include at a light emitting diode (LED) in combination with a diffuser and/or an electroluminescent (EL) panel. The diffuser may include a Lambertian diffuser.

In still further embodiments of the present invention, the liquid crystal display may include a plurality of micro-electromechanical hinges associated with the plurality of plates and attached to the micro-electromechanical array. The plurality of micro-electromechanical hinges may be configured to move the plurality of plates between the first and the second positions.

In some embodiments of the present invention, the liquid crystal display may include a sensor operably associated with the liquid crystal display and configured to sense ambient light and generate a control signal responsive thereto. The plurality of micro-electromechanical hinges may be further configured to move the plurality of plates between the first and second positions responsive to the control signal. In certain embodiments of the present invention, the sensor may include a phototransistor and/or a photodiode.

In further embodiments of the present invention, the micro-electromechanical array and the plurality of plates may include conductive elements. The control signal may be applied to the plates in the first position and not applied to the plates in the second position. The conductive plates may be attracted to the conductive array when the control signal is applied and may not be attracted to the conductive array when the control signal is not applied. In certain embodiments of the present invention, the control signal may be a voltage control signal.

In still further embodiments of the present invention, the liquid crystal display may further include an artificial light source underlying the micro-electromechanical array, a rear polarizer layer overlying the micro-electromechanical reflective array, a first transparent layer overlying the rear polarizer layer, a liquid crystal display layer overlying the first transparent layer, a second transparent layer overlying the liquid crystal display layer and a front polarizer layer overlying the second transparent layer. In certain embodiments of the present invention, the plates are substantially parallel to the liquid crystal layer in the first position and the plates are substantially normal to the liquid crystal layer in the second position.

Some embodiments of the present invention provide a liquid crystal display including a micro-electromechanical reflective array disposed in a liquid crystal display, a plurality of plates associated with the micro-electromechanical reflective array and a sensor configured to sense ambient light and generate a control signal. The plates are movable between first and second positions. The first position is substantially parallel to the liquid crystal display and the second position is substantially normal to the liquid crystal display. The plurality of plates are configured to be in the first position when the control signal is asserted and in the second position when the control signal is not asserted.

In further embodiments of the present invention, the liquid crystal display further includes an artificial light source underlying the micro-electromechanical reflective array. The artificial light source may be blocked and ambient light reflected when the plates are in the first position and the artificial light source may be exposed when the plates are in the second position. Accordingly, improved liquid crystal display having dual modes of operation responsive to ambient light may be provided according to embodiments of the present invention.

DETAILED DESCRIPTION

Figure 1:
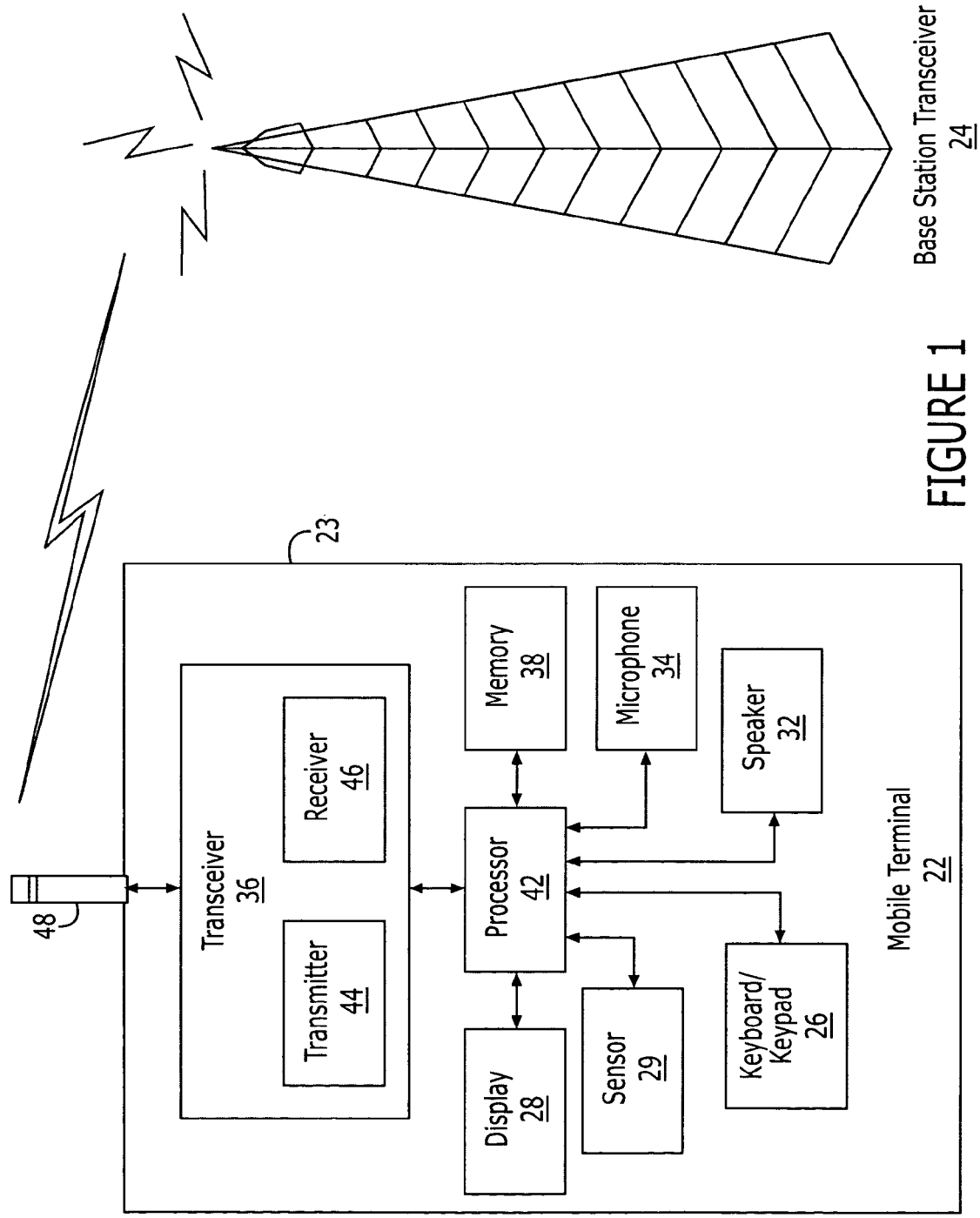
FIG. 1 is a block diagram of a mobile terminal according to embodiments of the present invention and a base station transceiver.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

Furthermore, relative terms such as overlying may be used herein to describe one layer or regions relationship to another layer or region as illustrated in the Figures. It will be understood that these terms are intended to encompass different orientations of the device in addition to the orientation depicted in the Figures. For example, if the device in the Figures is turned over, layers or regions described as "overlying" other layers or regions would now be oriented "below" or "underlying" these other layers or regions. The term "overlying" is intended to encompass both overlying and underlying in this situation. Like numbers refer to like elements throughout.

It will be understood that although the terms first and second are used herein to describe various elements or modes of operation, these elements or modes of operation should not be limited by these terms. These terms are only used to distinguish one element or mode of operation from another element or mode of operation. Thus, for example, a first mode discussed below could be termed a second mode, and similarly, a second mode may be termed a first mode without departing from the teachings of the present invention.

Embodiments of the present invention will now be described below with respect to FIGS. 1 through 7B. Embodiments of the present invention provide liquid crystal displays (LCDs) and devices, for example, mobile terminals, including micro-electromechanical reflective arrays including a plurality of plates configured to operate in a first mode of operation when the plurality of plates are in a first position and configured to operate in a second mode of operation when the plurality of plates are in a second position. The first mode may be a reflective mode of operation and the second mode may be a transmissive mode of operation. In certain embodiments, a plurality of hinges are associated with corresponding plates and attached to the micro-electromechanical array. The plurality of hinges are configured to move between first and second positions responsive to a control signal generated by a sensor. The sensor may sense ambient light and activate and/or deactivate the control signal responsive to ambient light conditions. Accordingly, embodiments of the present invention may provide dual mode liquid crystal displays having a pure reflective mode of operation and/or a pure transmissive mode of operation.

The present invention is described below with reference to block diagrams of liquid crystal displays and devices including the same according to embodiments of the invention. Embodiments of the present invention will now be described with reference to the schematic block diagram illustration of a mobile terminal in FIG. 1. Embodiments of the present invention may be used in conjunction with a mobile terminal 22, for example, a mobile terminal 22 of FIG. 1. Although liquid crystal displays are discussed herein as being included as part of a mobile terminal, embodiments of the present invention are not limited to this configuration. For example, liquid crystal displays according to embodiments of the present invention may be included in, for example, digital clocks and watches, microwave ovens, compact disc (CD) players and the like without departing from the teachings of the present invention.

FIG. 1 illustrates an exemplary radiotelephone communication system, in accordance with embodiments of the present invention, which includes the mobile terminal 22 and a base station transceiver 24 of a wireless communications network. The mobile terminal 22 includes a portable housing 23 and may include a keyboard/keypad 26, a display 28, a sensor 29, a speaker 32, a microphone 34, a transceiver 36, and a memory 38, any of which may communicate with a controller/processor 42. The transceiver 36 typically comprises a transmitter circuit 44 and a receiver circuit 46, which respectively transmit outgoing radio frequency signals to the base station transceiver 24 and receive incoming radio frequency signals, such as voice signals, from the base station transceiver 24 via an antenna 48. The radio frequency signals transmitted between the mobile terminal 22 and the base station transceiver 24 may comprise both traffic and control signals (e.g., paging signals/messages for incoming calls), which are used to establish and maintain communication with another party or destination. The controller/processor 42 may support various functions of the mobile terminal 22, including processing signals sensed by the sensor 29 with respect to the ambient light and providing signals generated by the sensor 29 to the display 28 so as to allow the liquid crystal display to switch between first and second modes according to embodiments of the present invention.

As used herein, the term "mobile terminal" may include: a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop portable computer, that may include a radiotelephone transceiver.

In some embodiments of the present invention, the base station transceiver 24 comprises the radio transceiver(s) that defines an individual cell in a cellular network and communicates with the mobile terminal 22 and other mobile terminals in the cell using a radio-link protocol. Although only a single base station transceiver 24 is shown, it will be understood that many base station transceivers may be connected through, for example, a mobile switching center and other devices to define a wireless communications network.

Although the present invention may be embodied in communication devices or systems, such as the mobile terminal 22, the present invention is not limited to such devices and/or systems. Instead, the present invention may be embodied in any apparatus that utilizes a liquid crystal display.

Figure 2:
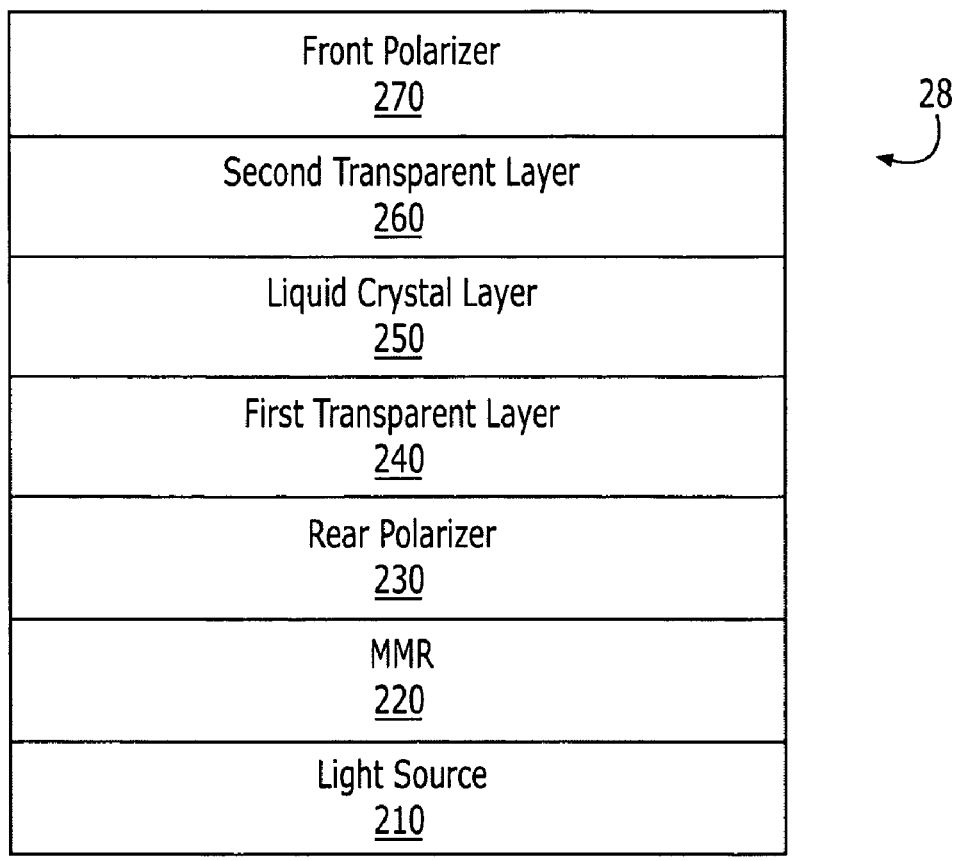
FIG. 2 is a schematic cross section view of liquid crystal displays (LCDs) according to some embodiments of the present invention.

Referring now to FIG. 2, liquid crystal displays 28 of FIG. 1 according to embodiments of the present invention may include a light source 210, a micro-electromechanical reflective (MMR) array 220, a rear polarizer layer 230, a first transparent surface 240, a liquid crystal layer 250, a second transparent surface 260 and a front polarizer 270. The layers that make up the liquid crystal display 28 may overlie one another as illustrated in FIG. 2. The light source 210 may be, for example, a point light source or a panel light source. If a point light source, for example, a light emitting diode (LED) or a fluorescent tube or bulb, is used, a diffuser may be used to evenly distribute the point light source across the liquid crystal display. The diffuser may be, for example, a highly transmissive Lambertian diffuser. A panel light source may be, for example, an electroluminescent (EL) panel. The rear polarizer layer 230, the first and second transparent surfaces 240 and 260, for example, glass or plastic, the liquid crystal layer 250, for example, indium tin oxide (ITO) and the front polarizer 270 are present in conventional liquid crystal displays. Thus, the details with respect to these elements will not be discussed further herein.

As discussed above, the first and second transparent surfaces 240 and 260 may be glass, for example, first and second glass substrates. In certain embodiments of the present invention, one of the glass substrates may be patterned to create a color filter array and the other glass substrate may be patterned to form thin film transistors. Color filter arrays, for example, red, green and blue (RGB) color filter arrays, provided on the outer glass substrate may provide a full color display for the LCD. In some embodiments a black matrix is provided so that each of the color elements (red, green and blue) have a black border area, which may be useful for definition and contrast. The color filter array formed on the glass substrate may be formed using many different methods, for example, a dye method or a pigment method, without departing from the teachings of the present invention. The details of the fabrication of color filter arrays are beyond the scope of this invention and will not be discussed further herein.

It will be understood that the cross section of FIG. 2 is provided for exemplary purposes only and that embodiments of the present invention are not limited to the configuration illustrated therein. Liquid crystal displays 28 according to embodiments of the present invention may include, for example, active or passive matrix liquid crystal displays without departing from the teachings of the present invention.

Figure 3:
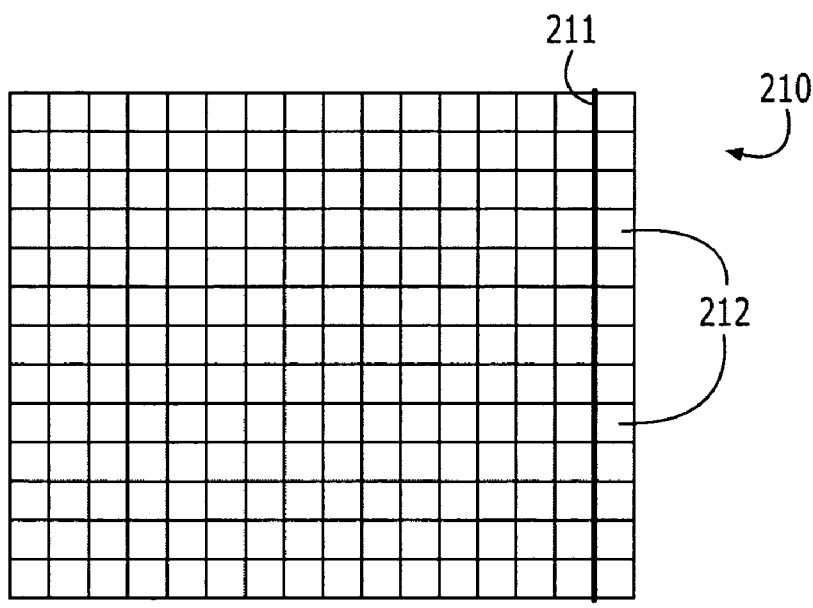
FIG. 3 is a top view of a micro-electromechanical reflective array and plates according to some embodiments of the present invention.

The MMR array 220 may be a highly reflective array like, for example, a mirror. As illustrated in FIG. 3, the MMR array 220 may include a plurality of plates 212. The MMR array 220 and the plates 212 may include a conductive material. The plurality of plates 212 may be configured to operate in a first mode of operation when the plurality of plates 212 are in a first position and to operate in a second mode of operation when the plurality of plates 212 are in a second position, as discussed further herein.

Figure 6A:
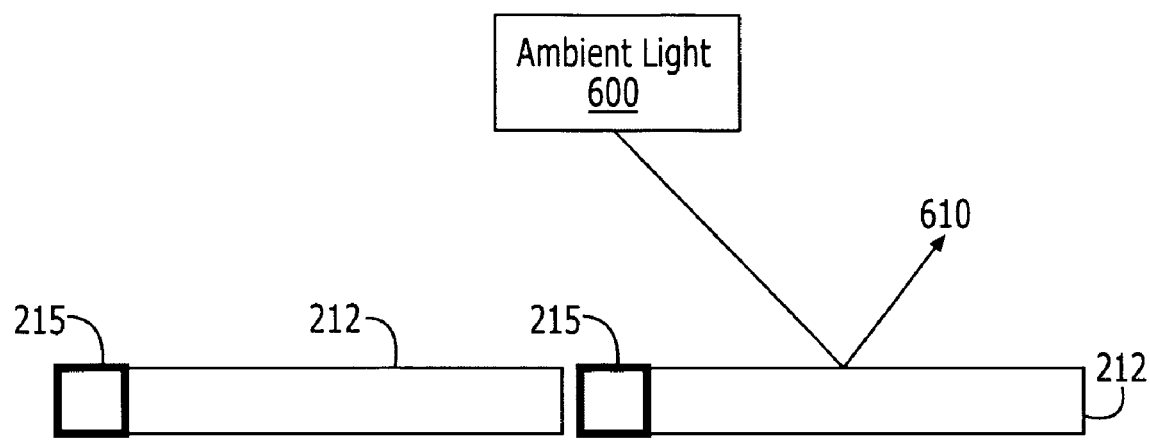
FIGS. 6A and 6B are schematic diagrams illustrating positions of a micro-electromechanical reflective array and plates according to embodiments of the present invention.

The first mode of operation may be, for example, a reflective mode of operation. The reflective mode of operation may be useful in brightly lit environments, for example, in sunlight or an office environment having fluorescent lighting. As discussed above, the MMR array 220 is highly reflective, or mirror-like, and is suitable for reflecting ambient light when the liquid crystal display 28 is operating in reflective mode. Thus, the plates 212 may be substantially parallel to the liquid crystal display in reflective mode as illustrated in FIG. 6A; i.e. the reflective surface of the plates 212 are positioned such that ambient light 600, for example, sunlight, is reflected off the surface (for example, path 610) of the plates 212. In certain embodiments of the present invention, the liquid crystal display may operate in pure reflective mode when the plates 212 are in the first position. As used herein, the term "pure" may include scenarios where not all the plates 212 are in the first position, i.e., the reflective position, but only substantially all of the plates 212 are in the first position.

Figure 6B:
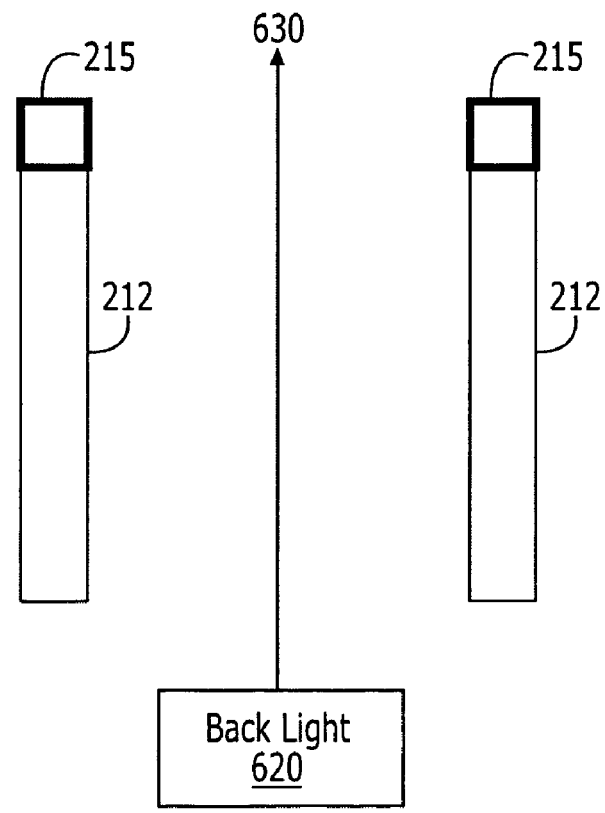

The second mode of operation may be, for example, a transmissive mode of operation. The transmissive mode of operation may be useful in poorly lit environments, for example, in evening light or in a poorly lit room during, for example, a power outage. Thus, in transmissive mode the ambient light may not be strong enough to reflect off the highly reflective surface of the plates 212. Accordingly, in transmissive mode, it may be beneficial to have the light source 210 included in the liquid crystal display 28 that may illuminate the display 28 from behind, i.e. a back light. Therefore, in the transmissive mode the plates 212 may be substantially normal to the liquid crystal display 28 as illustrated in FIG. 6B; i.e. the reflective surface of the plates 212 are positioned such that the back light 620 can shine through the plates (for example, path 630) and illuminate the liquid crystal display 28 from behind. In certain embodiments of the present invention, the liquid crystal display 28 may operate in pure transmissive mode when the plates 212 are in the second position. As discussed above, the term "pure" may include scenarios where not all the plates 212 are in the second position, i.e. transmissive position, but only substantially all of the plates 212 are in the second position.

In certain embodiments of the present invention, the plates 212 of the MMR array 220 may align with a plurality of pixels of the liquid crystal display 28; thus, the plurality of pixels may be set out in a grid form, like, for example, the MMR array 220 illustrated in FIG. 3. In further embodiments, the plates 212 may be as large as two or more pixel regions of the liquid crystal display 28 without departing from the teachings of the present invention. In embodiments of the present invention having plates larger than a single pixel region, it will be understood that the device including the liquid crystal display 28 may have an increased size to allow for the plates to move from the first position to the second position within the housing of the device, for example, housing 23 of the mobile terminal of FIG. 1.

Figure 4:
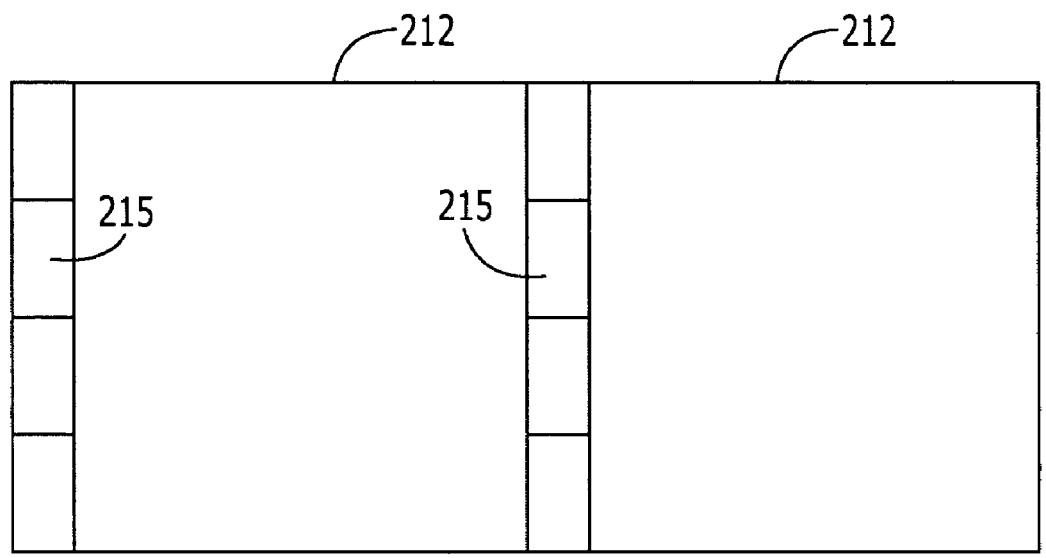
FIG. 4 is a schematic diagram illustrating a micro-electromechanical reflective array and plates including hinges according to embodiments of the present invention.

Referring now to FIG. 4, hinges associated with plates according to some embodiments of the present invention will be discussed. The liquid crystal display 28 may further include a plurality of hinges 215, for example, micro-electromechanical hinges, associated with the plurality of plates 212 and attached to the micro-electromechanical array 220. The hinges 215 may be located, for example, on the pixel gap 211, i.e. the region between pixels, of FIG. 3. Thus, the plurality of micro-electromechanical hinges 215 may be configured to move the plurality of plates 212 between the first (FIG. 6A) and second positions (FIG. 6B).

Figure 5A:
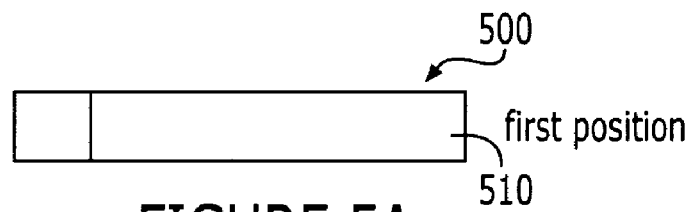
FIGS. 5A and 5B are schematic diagrams of exemplary cantilever hinges used in combination with the micro-electromechanical array and plates according to embodiments of the present invention.
Figure 5B:
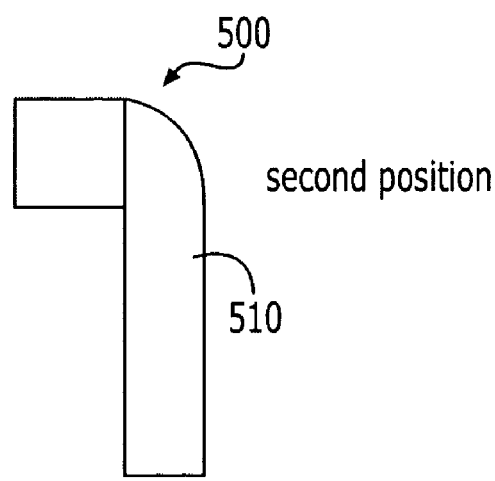

It will be understood that hinges according to embodiments of the present invention are not limited to those examples provided herein. Hinges according to embodiment of the present invention may include any type of hinge capable of moving the plates 212 between the first and second positions as discussed herein. For example, a hinge according to embodiments of the present invention may be a micro-electromechanical cantilever hinge 500 as illustrated in FIGS. 5A and 5B. As illustrated, the cantilever arm 510 of the cantilever hinge 500 may have first (FIG. 5A) and second (FIG. 5B) positions. The cantilever arm 510 may bend down from the first position (FIG. 5A) to the second (FIG. 5B) position as illustrated responsive to the application of a voltage control signal to the cantilever arm 510 as discussed below.

A sensor, for example, sensor 29 of FIG. 1, may be operably associated with the liquid crystal display 28 and configured to sense ambient light and generate a control signal responsive thereto. The sensor 29 should be located close to the liquid crystal display so that it may accurately sense the ambient light. The sensor 29 may be an optical sensor, for example, a phototransistor and/or a photodiode. In certain embodiments of the present invention, the hinges 215 may be further configured to move between first and second positions responsive to the control signal. For example, the sensor 29 may be configured to generate a control signal if the ambient light is measured at less than about 100 Lux. It will be understood that the point at which the sensor 29 generates the control signal may depend on the environment, the type of device the liquid crystal display is included in, user preferences and the like, and is not limited to examples provided herein.

Figure 7A:
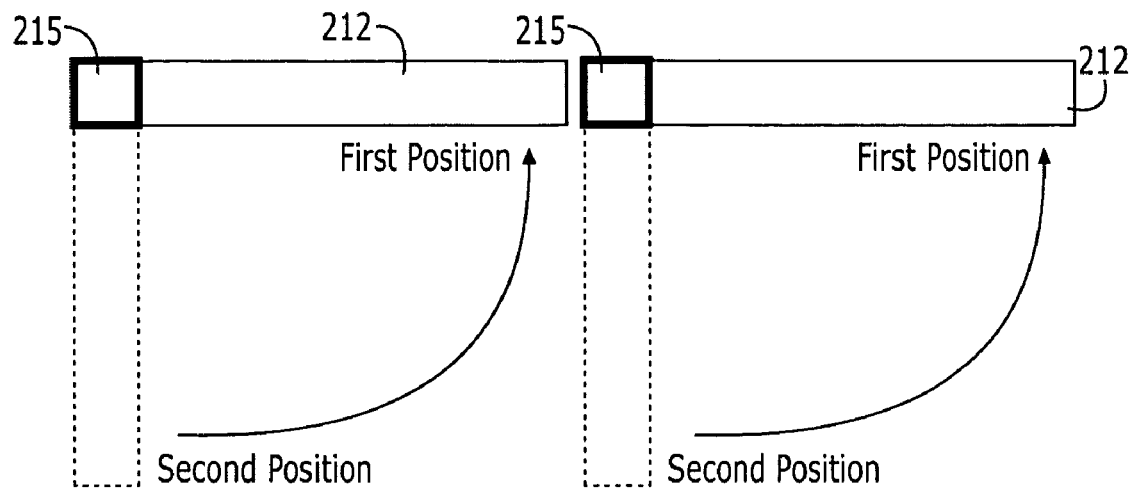
FIGS. 7A and 7B is a schematic diagram illustrating the movement of a micro-electromechanical reflective array and plates between a first position to a second position according to embodiments of the present invention.
Figure 7B:
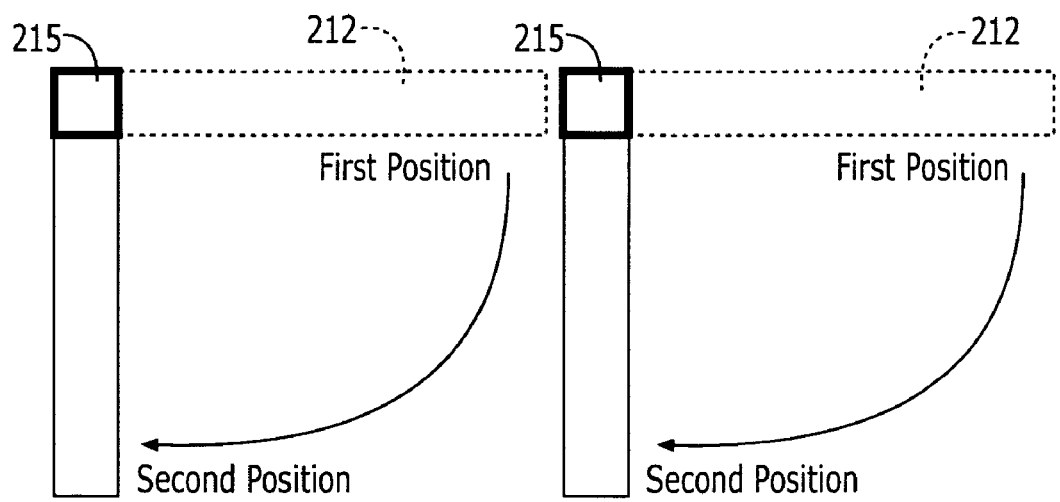

As discussed above, the MMR array 220 and the plates 212 may include conductive elements. In these embodiments, the control signal may be, for example, a voltage control signal. When the voltage control signal is applied to the MMR array 220 and the plates 212 (i.e. when the device is being used in a bright environment suitable for reflective mode), an electrostatic attraction may occur between these two elements and the plates 212 may move from the second position to the first position as illustrated in FIG. 7A. Similarly, when the voltage control signal is no longer applied to the MMR array 220 and the plates 212 (i.e. when the device is being used in a poorly lit environment suitable for transmissive mode), the electrostatic attraction will decrease, the hinge 210 will release the connection and the plates 212 may move from the first position to the second position as illustrated in FIG. 7B. It will be understood that the attraction between the conductive plates 212 and the MMR array 220 is not limited to an electrostatic attraction. For example, the attraction may be an electromagnetic attraction without departing from the teachings of the present invention.

As briefly discussed above with respect to FIGS. 1 through 7B, embodiments of the present invention provide liquid crystal displays having two modes of operation. The liquid crystal displays may be configured to switch between a reflective mode and a transmissive mode based on the ambient light that may be sensed by, for example, an optical sensor. Accordingly, liquid crystal displays according to embodiments of the present invention may provide improved, more versatile liquid crystal displays.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A liquid crystal display comprising:
a micro-electromechanical reflective array;
a plurality of plates associated with the micro-electromechanical reflective array, the plates being movable between first and second positions, the plates being configured to operate in a first mode of operation when the plurality of plates are in the first position and configured to operate in a second mode of operation when the plurality of plates are in the second position; and
a plurality of pixels, wherein ones of the plurality of plates correspond to ones of the plurality of pixels, wherein the first mode of operation is a reflective mode of operation and wherein the second mode of operation is a transmissive mode of operation.

2. The liquid crystal display of claim 1 wherein the reflective mode comprises a pure reflective mode and the transmissive mode comprises a pure transmissive mode.

3. The liquid crystal display of claim 1 further comprising an artificial light source, wherein the micro-electromechanical reflective array is positioned adjacent the artificial light source, and wherein the light source is exposed through the plurality of plates during the transmissive mode of operation.

4. The liquid crystal display of claim 3, wherein the artificial light source comprises at least one of a light emitting diode (LED) in combination with a diffuser and an electroluminescent (EL) panel.

5. The liquid crystal display of claim 4 wherein the diffuser comprises a Lambertian diffuser.

6. The liquid crystal display of claim 3 further comprising:
a plurality of micro-electromechanical hinges associated wit the plurality of plates and attached to the micro-electromechanical array, the plurality of micro-electromechanical hinges being configured to move the plurality of plates between the first and the second positions.

7. The liquid crystal display of claim 6 further comprising:
a sensor operably associated with the liquid crystal display and configured to sense ambient light and generate a control signal responsive thereto, wherein the plurality of micro-electromechanical hinges are further configured to move the plurality of plates between the first and second positions responsive to the control signal.

8. The liquid crystal display of claim 7 wherein the sensor comprises at least one of a phototransistor and a photodiode.

9. The liquid crystal display of claim 7 wherein the micro-electromechanical array and the plurality of plates comprise conductive elements, wherein the control signal is applied to the plates in the first position, and wherein the control signal is not applied to the plates in the second position.

10. The liquid crystal display of claim 9, wherein the conductive plates are attracted to the conductive array when the control signal is applied and conductive plates are not attracted to the conductive array when the control signal is not applied.

11. The liquid crystal display of claim 10 wherein the control signal is a voltage control signal.

12. A liquid crystal display comprising:
   a micro-electromechanical reflective array;
   a plurality of plates associated with the micro-electromechanical reflective array, the plates being movable between first and second positions, the plates being configured to operate in a first mode of operation when the plurality of plates are in the first position and configured to operate in a second mode of operation when the plurality of plates are in the second position;
   an artificial light source, the micro-electromechanical reflective array overlying the artificial light source;
   a rear polarizer layer overlying the micro-electromechanical reflective array;
   a first transparent layer overlying the rear polarizer layer;
   a liquid crystal display layer overlying the first transparent layer;
   a second transparent layer overlying the liquid crystal display layer; and
   a front polarizer layer overlying the second transparent layer.

13. The liquid crystal display of claim 12 wherein in the first position, the plates are substantially parallel to the liquid crystal layer, and in the second position, the plates are substantially normal to the liquid crystal layer.

14. A liquid crystal display comprising:
   a micro-electromechanical reflective array disposed in a liquid crystal display;
   a plurality of plates associated with the micro-electromechanical reflective array, the plates being movable between first and second positions, the first position being substantially parallel to the liquid crystal display and the second position being substantially normal to the liquid crystal display; and
   a sensor configured to sense ambient light and generate a control signal, the plurality of plates being configured to be in the first position when the control signal is asserted and configured to be in the second position when the control signal is not asserted.

15. The liquid crystal display of claim 14 further comprising:
   an artificial light source, wherein the micro-electromechanical reflective array overlies the artificial light source, wherein the artificial light source is blocked and ambient light is reflected when the plates are in the first position and wherein the artificial light source is exposed when the plates are in the second position.

16. The liquid crystal display of claim 15, wherein the artificial light source comprises at least one of a light emitting diode (LED) in combination with a diffuser and an electroluminescent panel.

17. The liquid crystal display of claim 16 wherein the diffuser comprises a Lambertian diffuser.

18. The liquid crystal display of claim 14 further comprising:
   a plurality of micro-electromechanical hinges associated with the plurality of plates and attached to the micro-electromechanical array, the plurality of micro-electromechanical hinges being configured to move the plurality of plates between the first and second positions.

19. The liquid crystal display of claim 18 wherein the plurality of micro-electromechanical hinges are further configured to move the plurality of plates between the first and second positions responsive to the control signal.

20. The liquid crystal display of claim 14 wherein the sensor comprises at least one of a phototransistor and a photodiode.

21. The liquid crystal display of claim 14 wherein the micro-electromechanical array and the plurality of plates comprise conductive elements, wherein the control signal is applied to the plates in the first position, and wherein the control signal is not applied to the plates in the second position.

22. The liquid crystal display of claim 21, wherein the conductive plates are attracted to the conductive array when the control signal is applied and conductive plates are not attracted to the conductive array when the control signal is not applied.

23. The liquid crystal display of claim 22 wherein the control signal is a voltage control signal.

24. The liquid crystal display of claim 14 further comprising:
   an artificial light source, the micro-electromechanical reflective array overlying The artificial light source;
   a rear polarizer layer overlying the micro-electromechanical reflective array;
   a first transparent layer overlying the rear polarizer layer;
   a liquid crystal layer overlying the first transparent layer;
   a second transparent layer overlying the liquid crystal layer; and
   a front polarizer layer overlying the second transparent layer.

25. A device comprising:
   a housing; and
   a liquid crystal display integrated with the housing, the liquid crystal display including a micro-electromechanical reflective array and a plurality of plates associated with the micro-electromechanical reflective array, the plates being movable between first and second positions, the plates being configured to operate in a first mode of operation when the plurality of plates are in the first position and configured to operate in a second mode of operation when the plurality of plates are in the second position, wherein the liquid crystal display further comprises a plurality of pixels, wherein ones of the plurality of plates correspond to ones of the plurality of pixels, wherein the first mode of operation is a reflective mode of operation and wherein the second mode of operation is a transmissive mode of operation.

26. The device of claim 25, wherein the device comprises a mobile terminal.

27. The device of claim 26 wherein the reflective mode comprises a pure reflective mode and the transmissive mode comprises a pure transmissive mode.

28. The device of claim 26 wherein the liquid crystal display further comprises an artificial light source, wherein the micro-electromechanical reflective array is positioned adjacent the artificial light source, and wherein the light source is exposed through the plurality of plates during the transmissive mode of operation.

29. The device of claim 28 wherein the liquid crystal display further comprises a plurality of micro-electromechanical hinges associated with the plurality of plates and attached to the micro-electromechanical array, the plurality of micro-electromechanical hinges being configured to move the plurality of plates between the first and second positions.

30. The device of claim 29 further comprising:
a sensor positioned adjacent the liquid crystal display and operably associated with the liquid crystal display and configured to sense ambient light and generate a control signal responsive thereto, wherein the plurality of micro-electromechanical hinges are further configured to move the plurality of plates between the first and second positions responsive to the control signal.

31. The device of claim 30 wherein the micro-electromechanical array and the plurality of plates comprise conductive elements, wherein the control signal is applied to the plates in the first position, and wherein the control signal is not applied to the plates in the second position.

32. The device of claim 31, wherein the conductive plates are attracted to the conductive array when the control signal is applied and conductive plates are not attracted to the conductive array when the control signal is not applied.

33. A device comprising:

a housing; and a liquid crystal display integrated with the housing, the liquid crystal display including a micro-electromechanical reflective array and a plurality of plates associated with the micro-electromechanical reflective array, the plates being movable between first and second positions, the plates being configured to operate in a first mode of operation when the plurality of plates are in the first position and configured to operate in a second mode of operation when the plurality of plates are in the second position, wherein in the first position, the plates are substantially parallel to the liquid crystal display, and in the second position, the plates are substantially normal to the display.

* * * * *

UNITED STATES PATENT AND TRADEMARK OFFICE
CERTIFICATE OF CORRECTION

PATENT NO. : 7,218,364 B2
APPLICATION NO. : 10/699397
DATED : May 15, 2007
INVENTOR(S) : Brindel Page 1 of 1

It is certified that error appears in the above-identified patent and that said Letters Patent is hereby corrected as shown below:

On The Title Page Sec. (54), and Column 1:
  Please correct title to read --Dual Mode Liquid Crystal Displays (LCDs) And Devices Including The Same--

In The Claims:

Column 8, Claim 6, Line 45: Please correct "wit"
  To read -- with --

Column 10, Claim 24, Line 22: Please correct "The"
  To read -- the --

Signed and Sealed this

Twenty-eighth Day of August, 2007

JON W. DUDAS
*Director of the United States Patent and Trademark Office*